June 4, 1957 D. O. PERRY 2,794,609
MULTIPLE BRAKE SYSTEM FOR AIRCRAFT
Filed Nov. 30, 1953 2 Sheets-Sheet 1
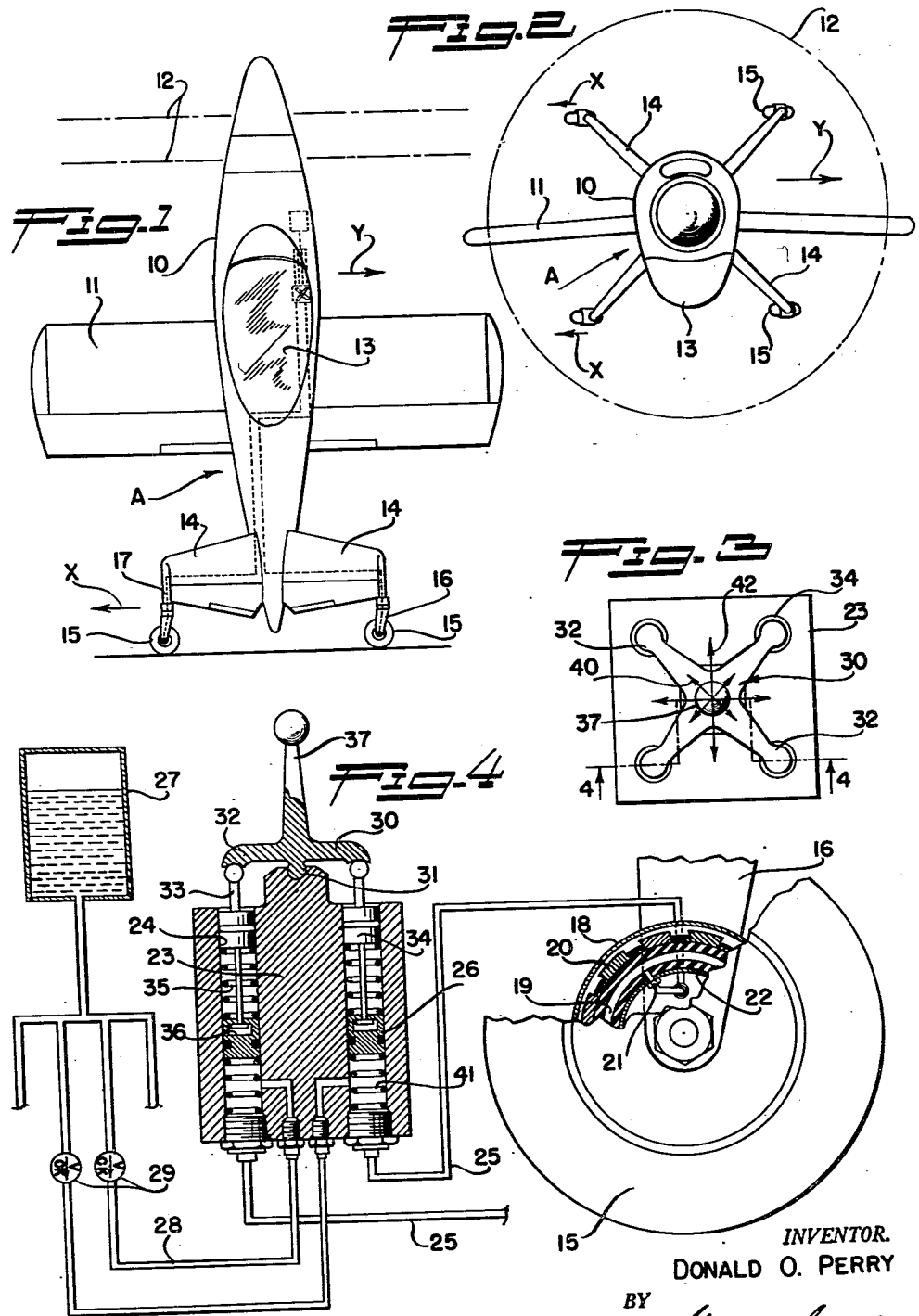
INVENTOR.
DONALD O. PERRY
BY
George Sullivan
Agent

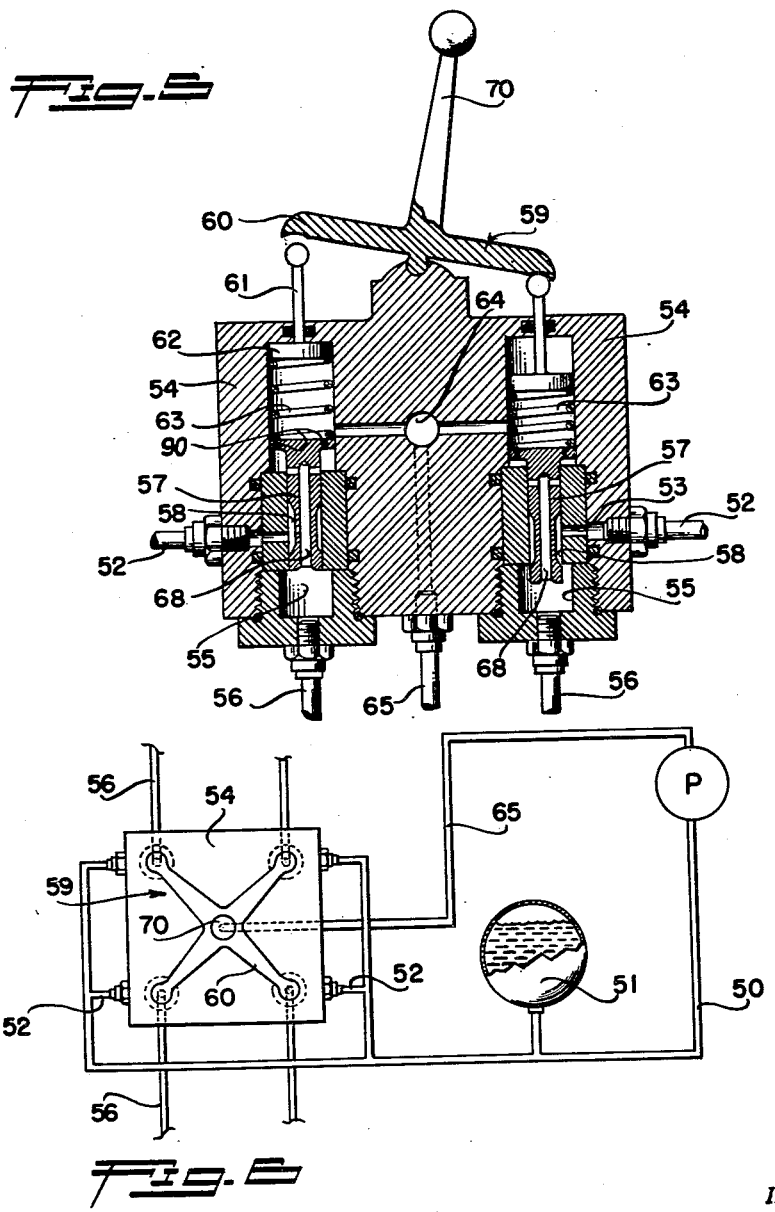

United States Patent Office 2,794,609
Patented June 4, 1957

2,794,609

MULTIPLE BRAKE SYSTEM FOR AIRCRAFT

Donald O. Perry, Glendale, Calif., assignor to Lockheed Aircraft Corporation, Burbank, Calif.

Application November 30, 1953, Serial No. 395,087

9 Claims. (Cl. 244—111)

This invention relates to aircraft and relates more particularly to brake means for airplanes and the like.

The present invention has to do with aircraft brake systems wherein a plurality of brakes are capable of individual or selective control. It is contemplated that the features of the invention may be incorporated in brake apparatus for use on aircraft varying considerably in type and in the mode of operation or handling. In order to exemplify the invention I will describe it in connection with the vertical rising and descending class of arplane wherein there are wheeled landing gears facing or projecting aft from the empennage or aft portion and wherein the airplane is capable of rising substantially vertical from a tail-down attitude for the take off and of descending substantially vertical in the tail-down vertical attitude during landing. In such an airplane there is a plurality of spaced landing wheels, say, four wheels, and in order to facilitate the ground handling of the airplane, each of these wheels is equipped with a brake.

It is a general object of the present invention to provide a simple, practical and readily manipulated brake means or system for aircraft of the general kind above referred to and for airplanes of other types.

Another object of the invention is to provide a brake means of this kind that permits the actuation of the brakes of selected wheels or selected pairs of wheels to readily maneuver, steer, or turn the airplane while being translated or being moved across the ground; the locking or setting of the brake of one wheel to permit the standing airplane to "weather-cock" into the wind; the application of pressure to the brakes of the trailing wheels when the airplane is being translated across the ground or field, thus preventing tip-over of the upright tail-down airplane; and of performing various other operations.

Another object of the invention is to provide a brake means of this character incorporating a single lever or manual handle that is capable of actuating the individual brakes or the brakes of pairs of landing wheels. The single manual lever is easily operated to control or actuate any selected brake or brakes of the airplane and may preferably be so arranged that the directoin of handle movement is in the direction of desired deceleration.

A still further object of the invention is to provide a brake system of the class described embodying spring means associated with each brake actuating cylinder or valve to limit the pilot force applied thereto, thereby preventing the application of excessive braking forces.

Other objectives and features will become apparent from the following detailed description of typical preferred embodiments of the invention, throughout which reference will be made to the accompanying drawings wherein:

Figure 1 is a front or side view of a vertical rising type airplane supported in the vertical tail-down position on the ground, the arrow indicating the direction of translation of the airplane;

Figure 2 is a top or plan view of the airplane shown in Figure 1;

Figure 3 is an enlarged plan view of the cylinder assembly or unit, the arrows indicating the various directions in which the lever or handle may be moved to actuate the brakes;

Figure 4 is a more or less diagrammatic view of one form of brake system of the invention showing the cylinder unit or assembly in longitudinal cross section, this portion of the figure being taken as indicated by line 4—4 on Figure 3, and illustrating a portion of one of the brakes;

Figure 5 is an enlarged vertical or longitudinal sectional view of another embodiment of the cylinder or valve assembly of the invention showing one of the valves in the open or operated position; and Figure 6 is a diagrammatic view of the brake system incorporating the unit illustrated in Figure 5.

In the drawings, I have shown two embodiments of brake devices or systems of the invention associated with or incorporated in an airplane A of the vertical rising type, referred to above. The airplane includes a fuselage 10, wings 11, propellers 12 at the nose or forward end of the fuselage, a pilot's compartment or cockpit 13, and a tail or empennage. In the particular case illustrated, the empennage includes four tail surfaces 14 disposed at approximately 45 degrees to the plane occupied by the wings 11. As illustrated in Figures 1 and 2, each tail part or surface 14 is provided with a landing wheel 15. The wheels project aft from the surfaces 14 and are preferably of the full castering type, being carried by arms or forks 16. These forks 16 in turn may preferably be mounted on shock absorbers 17, the details of which form no special part of the present invention. The four spaced wheels 15 disposed beyond the trailing edges of the tail surfaces 14, provide a broad or effective "footprint" for dependably supporting the airplane A in the upright or vertical tail-down position when on the field or ground.

The brake system includes a brake for each wheel 15. The brakes may be of any selected type capable of actuation or control by fluid pressure. As illustrated in Figure 4, the brakes are of the expanding tube type, it being understood that this is just one suitable class of brake means adapted to be employed with the invention. Each brake assembly may include a drum 18 rotatable with the wheel 15 and a relatively stationary tube 19 of synthetic rubber, or the like, arranged around a stationary inner drum or flange 22. Segmental shoes 20 are arranged at the periphery of the tube 19 to be actuated against the internal surface of the drum 18 to provide the braking action when the tube is expanded by internal fluid pressure. A connection or fitting 21 has communication with the interior of the tube 19 to supply the actuating or expanding fluid pressure thereto.

The invention includes a manually actuated cylinder and piston means for each brake. In accordance with the invention these cylinder means are arranged in spaced but adjacent relation one to the other and, in practice, the four cylinders may be arranged in a single assembly or block 23. The block 23 need not be an integral part, as illustrated, but may be an assembly of the four cylinder devices. The block 23 is arranged in or adjacent the pilot's compartment and has four parallel cylinders 24 which, for the sake of conveniece, may be considered as substantially vertical, assuming the airplane to be in the horizontal normal flight attitude. The cylinders 24 are equally or symmetrically spaced and a line 25 extends from the lower end of each cylinder to the fitting 21 of its respective expander tube 19, there being a cylinder 24 for each brake. A plunger or piston 26 is operable downwardly in each cylinder 24 to displace or force the fluid through its respective line 25 and thus actuate the related brake. A reservoir 27 is arranged to supply the liquid to the lower ends of the cylinders 24 by gravity through a system of lines or pipes 28, check valves 29 being provided to prevent reverse flow through the pipes.

The means for actuating the pistons 26 includes a spider-like member 30 arranged at the upper end of the block 23 for manual operation. The member 30 has a ball and socket mounting 31 on the block so that it may be pivoted in various directions about the mounting. Four equally spaced legs 32 radiate from the member 30 and each leg terminates directly above a cylinder 24. Lost motion spring loaded connections are provided between the legs 32 and the pistons 26 of the related cylinders. These connections include rods 33 having heads at their upper ends engaged by the legs 32 so that operation of the member 30 is adapted to move the rods downwardly in the cylinders. The rods 33 carry collars 34 which are slidably guided in the cylinders 24 and compression springs 35 are engaged between the collars and the pistons 26. The inner ends of the rods 33 are enlarged and are received in sockets 36 in the pistons 26 with considerable play or lost motion to provide the lost motion connections between the rods and pistons. The spring loaded lost motion connections, just described, limit the maximum braking force that may be applied providing for a predetermined maximum force applied to the pistons 26 through the springs 35 and, therefore, a predetermined maximum pressure applied to the fluid in the lines 25 and expander tubes 19 of the brakes.

An upstanding handle or lever 37 is provided on the member 30 to facilitate its manual actuation. It will be seen that the four springs 35, acting on the collars 34, assist in normally holding the member 30 in the position of Figure 4 where the lever 37 is upright. Figure 3 includes arrows indicating the directions in which the lever 37 may be actuated. The shorter arrows 40, pointed toward the ends of the legs 32, indicate that the member 30 may be pivoted or actuated in these four directions to operate the individual pistons 26 aligned with the ends of the respective legs 32 and thus actuate or apply the individual brakes. Thus the lever 37 may be actuated to selectively apply the brakes at the individual wheels 15. Springs 41 are arranged under compression against the lower sides of the pistons 26 and are operable to return their respective pistons to the normal or unactuated positions when the manual force is removed from the lever 37. It will also be understood how the springs 41 acting through the pistons 26 cooperate with the springs 35 to normally hold the member 30 in its idle unactuated position where the lever 37 is upright. The longer arrows 42 in Figure 3 indicate that the lever 37 may be actuated in these directions to apply the brakes of any two adjacent wheels 15; for example in Figure 2 the arrow X indicate that the brakes at the two trailing wheels 15 of the airplane are applied.

Figures 5 and 6 illustrate an embodiment or arrangement of the invention adapted to employ hydraulic pressure from the usual hydraulic system of the airplane. As diagrammatically illustrated in Figure 6, the system includes a pump P for supplying pressure to a line 50. A suitable accumulator 51 is connected to the line 50 and the line has four branches 52 communicating with ports 53 in a cylinder or valve block 54. The ports 53 in turn communicate with mid-points in cylinder or valve openings 55. Pipes 56 corresponding in function with the pipes 25 described above, lead from the ends of the openings 55 to the expander tubes 19 of the brakes. Sliding valves 57, having lapped fits in the lined mid-portions of the openings 55 control the ports 53. An annular groove 58 is provided in the periphery of each valve 57 to communicate with the related port 53. Upon downward movement of a valve 57 from the normal closed position of the left hand valve of Figure 5 to the open position of the right hand valve of the same figure, fluid pressure is supplied to the related pipe 56 from the port 53 and the related brake is applied or actuated. The valves 57 are such that they may be partially opened or "cracked" to apply limited pressure to their respective brakes.

The means for operating the valves 57 includes a member 59 which may be substantially the same as the member 30 described above and mounted on the upper end of the valve block 54 by a ball and socket connection so as to have angular movement in various directions. The operating member 59 is provided with an upstanding manual handle or lever 70. The legs 60 of the member 59 cooperate with the ends of stems 61 which, in turn, carry heads 62 slidable in the upper ends of the valve openings 55. Compression springs 63 are engaged between the heads 62 and the upper ends of the valves 57 to transmit the downward actuating force to the valves when the member 59 is manually moved. The block 54 has a system of ports 64 leading from the upper portions of the four valve openings 55 to a return line 65 which may return to the suction side of the pump P. The piston-like valves 57 have pressure return ports 68 leading from their lower ends to their upper portions where they communicate with the openings 164. The upper end portions of the valves 57 are enlarged in diameter for engagement by the springs 63. These enlarged portions of the valves 57 have spaced small ports 90 for maintaining the pressure return ports 68 in communication with the ports 64 when the valves are in their closed positions. The sliding engagement of the valves 57 in the lined openings 55 closes the upper ends of these ports 68 when the valves are moved to their open positions. However, upon the removal of the manual operating force from the lever 70, the fluid pressure acting on the lower or downwardly facing surfaces of a valve 57 moves the valve upwardly to uncover its port 68 to the upper portion of the opening 55 and thus relieve the pressure in the line 56 and the brake expander tube 19. It is to be observed that the pressure exerted on the brake shoes 20 is substantially proportional to the force applied by the pilot to the related valve 57 through the medium of the spring 63.

It is believed that the operation of the brake systems of the invention will be readily understood from the foregoing detailed description. When the airplane is being translated or moved along the ground, as indicated by the arrows Y in Figures 1 and 2, it may be desirable to apply some braking force to the trailing wheels 15 to prevent the airplane from tipping over. This is accomplished by moving the lever 37 or 70 in the aft direction to apply pressure to the expander tubes 19 of the brakes for the two aft wheels 15. The pilot can readily turn or control rotation of the airplane while it is being translated on the ground or landing strip by appropriate selective or differential pressure on the control lever 37 or 70 to apply the selected brake or brakes. Again, when the airplane is stopped or standing on the field it may be desirable to move the lever 37 or 70 in the direction of one of the arrows 40 to lock or apply the brake at one wheel 15 so that the airplane may be free to turn on the castered wheels 15 with the one wheel as a pivot and thus "weather-cock" into the wind. The ability to control or actuate the brakes of the four wheels 15 individually and selectively, greatly facilitates the maneuvering or handling of the airplane on the ground. As pointed out above, the spring means 35 or 63 interposed in the actuating or control system limits the force actually applied by movement of the control lever 37 or 70, thus preventing sudden or excessive braking action even though the pilot applies excessive manual force to the control lever.

Having described only typical forms of the invention I do not wish to be limited to the specific details herein set forth, but wish to reserve to myself any variations or modifications that may appear to those skilled in the art and fall within the scope of the following claims.

I claim:

1. In an airplane having a fuselage; at least three spaced landing wheels projecting aft from the aft end of the fuselage, a fluid actuated brake for each wheel, a control for each brake operable to supply actuating fluid pressure thereto, and a single control member manually operable to selectively operate any one of said controls or to selectively operate certain pairs of said controls.

2. In an airplane having a fuselage; at least three spaced landing wheels projecting aft from the aft end of the fuselage, a fluid actuated brake for each wheel, a control for each brake operable to supply actuating fluid pressure thereto, said controls being in adjacent relation, and a single manual lever having parts cooperable with said controls and movable to selectively operate any individual control and also movable to operate simultaneously any pair of adjacent controls.

3. In an airplane having a fuselage; at least three spaced landing wheels projecting aft from the aft end of the fuselage, a fluid actuated brake for each wheel, a control for each brake operable to supply actuating fluid pressure thereto, said controls being in adjacent relation, a manual control lever having parts cooperable with said controls, and means mounting the lever for universal movement to be manually movable to selectively operate any individual control and also movable to operate any pair of adjacent controls.

4. In an airplane having at least three spaced landing wheels; brakes for the wheels, and a system for operating the brakes comprising a fluid pressure operating device for each brake, a control for each device including a piston and cylinder unit for supplying pressure to its respective device, said units being in spaced adjacent relation, and an operating handle movable to selectively operate any of the individual controls and also movable to operate any pair of adjacent controls.

5. In an airplane having a fuselage; at least three spaced landing wheels projecting aft from the aft end of the fuselage, a fluid actuated brake for each wheel, a control for each brake operable to supply actuating fluid pressure thereto, said controls being in adjacent relation and each including a cylinder and piston for supplying actuating pressure to its respective brake, and a single control member manually operable to selectively operate any of the individual controls and also movable to operate simultaneously any pair of adjacent controls.

6. In an airplane having a fuselage; four spaced landing wheels projecting aft from the aft end of the fuselage, a fluid actuated brake for each wheel, a control for each brake operable to supply actuating fluid pressure thereto, said controls being spaced in adjacent relation and each including a cylinder and piston device, and a spring means for transmitting actuating force thereto, and an operating handle manually operable to given positions to selectively operate said controls individually through their spring means and also movable to other given positions to operate any pair of adjacent controls through their spring means.

7. In an airplane having a fuselage; at least three spaced landing wheels projecting aft from the aft end of the fuselage, a fluid actuated brake for each wheel, a control for each brake operable to supply actuating fluid pressure thereto, there being a source of fluid pressure, each control including a valve operable to control the flow of pressure from said source to its respective brake, and spring means for transmitting operating force to the valve, and a single manual lever having parts cooperable with said spring means and movable to given positions to selectively operate the individual controls and also movable to other given positions to selectively operate any pair of adjacent controls.

8. An airplane including a fuselage, at least three spaced landing wheels protruding at the aft end of the airplane to support the airplane in a vertical tail-down attitude, a brake for each wheel, a separate control for each brake, the controls being in adjacent relation, and a single manual operating member selectively movable to certain positions to actuate the individual controls and also movable to other certain positions to actuate any pair of adjacent controls.

9. In an airplane having a fuselage; at least three spaced landing wheels projecting aft from the aft end of the fuselage, a fluid actuated brake for each wheel, a control for each brake operable to supply actuating fluid pressure thereto, the controls including cylinders in spaced adjacent relation and pistons operable therein, spring means for transmitting operating force to the pistons, a single manual lever, parts on the lever for cooperating with the spring means, and means supporting the lever for universal movement to be movable to actuate individual pistons or the pistons of adjacent pairs of cylinders to selectively control the brakes.

References Cited in the file of this patent

UNITED STATES PATENTS

| | | |
|---|---|---|
| 1,823,255 | Charles | Sept. 15, 1931 |
| 2,074,730 | Kerr | Mar. 23, 1937 |
| 2,085,173 | Standbury | June 29, 1937 |
| 2,308,802 | Barling | Jan. 19, 1943 |
| 2,346,820 | Casler et al. | Apr. 18, 1944 |
| 2,430,808 | Eaton | Nov. 11, 1947 |
| 2,700,904 | Woods | Feb. 1, 1955 |

FOREIGN PATENTS

| | | |
|---|---|---|
| 555,392 | Germany | July 23, 1932 |